J. M. SANDERS.
FERTILIZER DISTRIBUTER.
APPLICATION FILED FEB. 25, 1911.
1,008,200.
Patented Nov. 7, 1911.
4 SHEETS—SHEET 4.
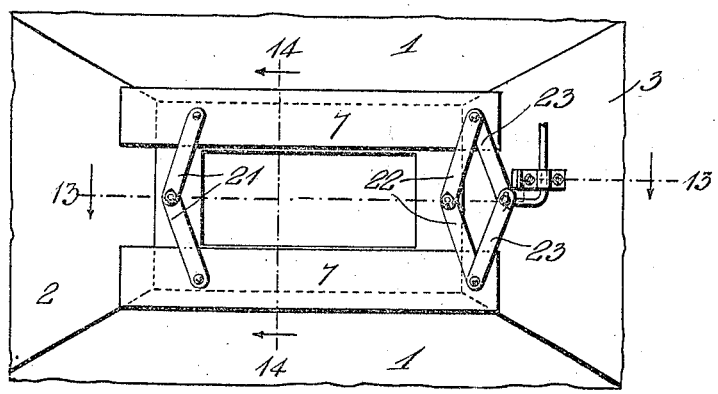
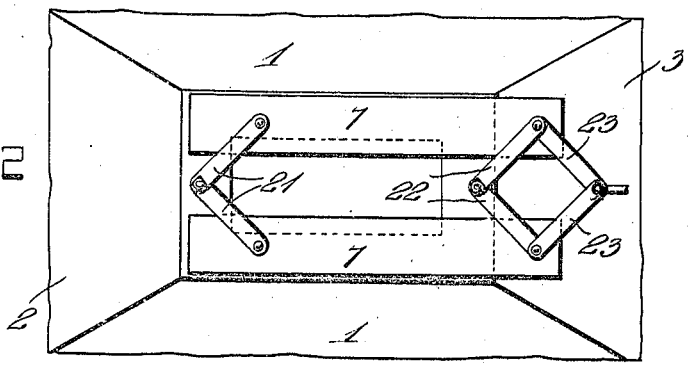
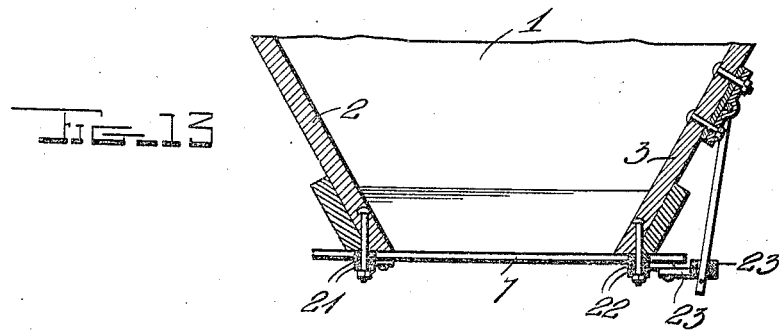
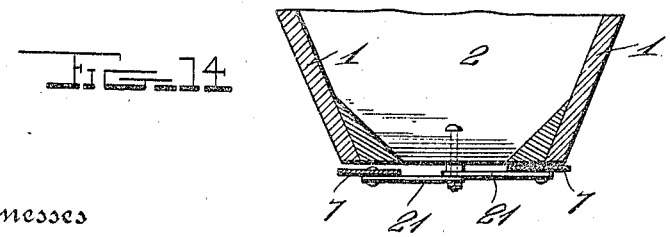
Witnesses
Inventor
John M. Sanders
By William W. Deane,
his Attorney

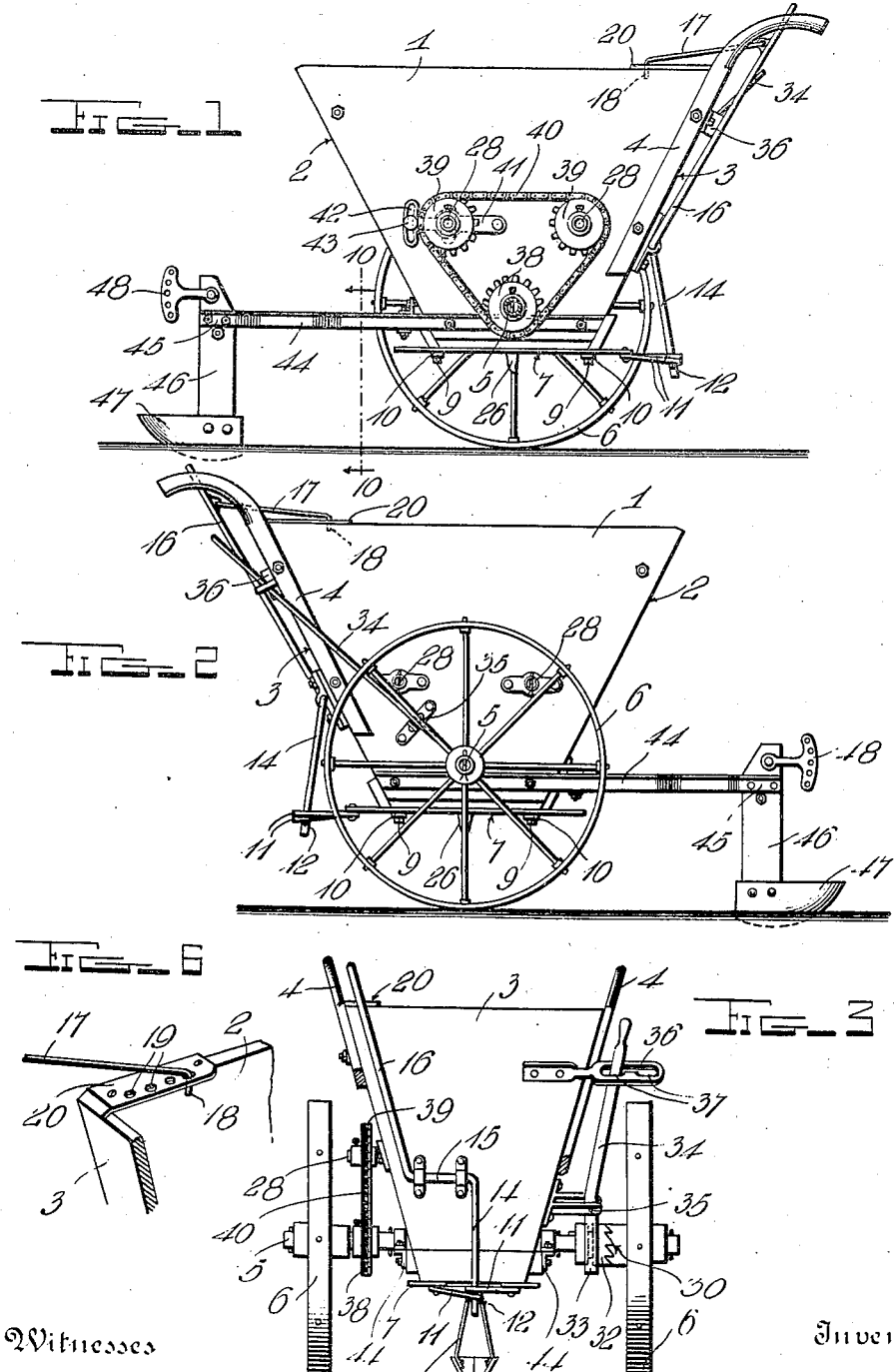

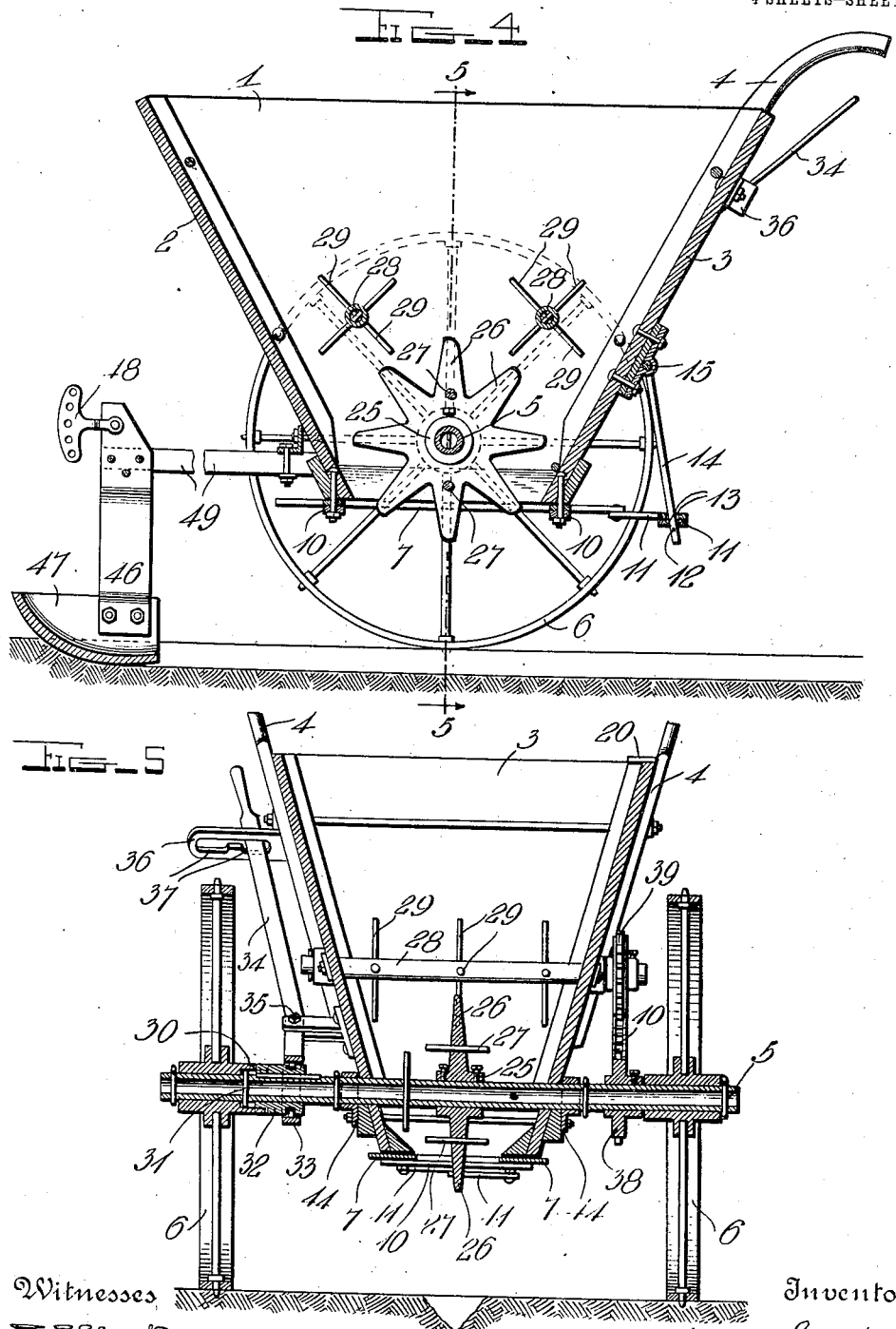

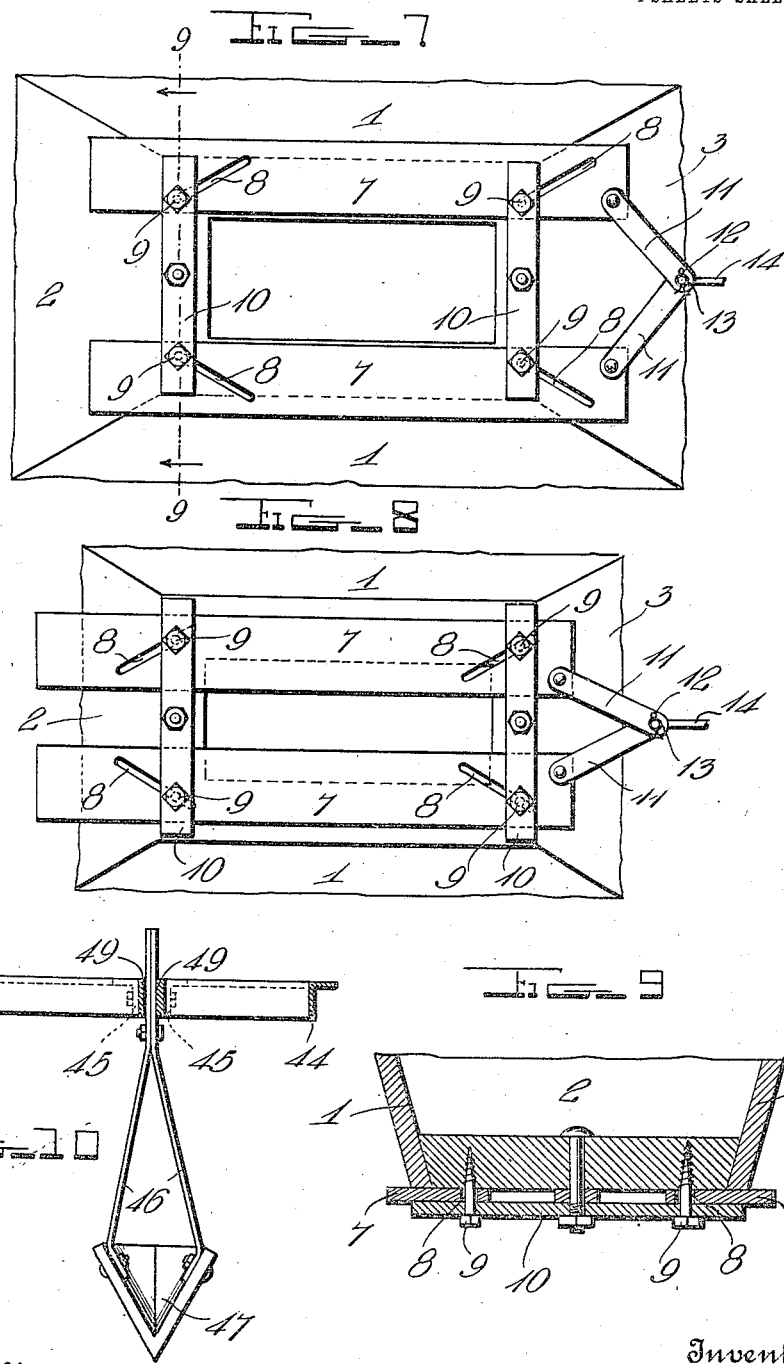

UNITED STATES PATENT OFFICE.

JOHN M. SANDERS, OF ROME, GEORGIA.

FERTILIZER-DISTRIBUTER.

1,008,200.  Specification of Letters Patent.  Patented Nov. 7, 1911.

Application filed February 25, 1911. Serial No. 610,891.

*To all whom it may concern:*

Be it known that I, JOHN M. SANDERS, citizen of the United States, residing at Rome, in the county of Floyd and State of Georgia, have invented certain new and useful Improvements in Fertilizer-Distributers, of which the following is a specification.

It is the object of the present invention to provide an improved construction of fertilizer distributer.

The aim of the invention is to provide, in a distributer of this type, novel means for regulating the discharge of the material from the hopper thereof, the operating means being located in convenient position and the connection between the operating means and the discharge-regulating means being of such character as to insure of even discharge at any adjustment.

In the accompanying drawings, Figure 1 is a view in side elevation of the machine embodying the present invention, Fig. 2 is a similar view looking at the opposite side thereof, Fig. 3 is a rear elevation of the machine, Fig. 4 is a vertical longitudinal sectional view of the invention taken centrally and longitudinally through the machine, Fig. 5 is a transverse sectional view on the line 5—5 of Fig. 4, Fig. 6 is a detail perspective view of the adjusting means for the discharge-regulating means, Fig. 7 is a bottom plan view of the hopper of the machine showing the discharge-regulating plates in full open position, Fig. 8 is a similar view showing the plates partly closed, Fig. 9 is a transverse sectional view on the line 9—9 of Fig. 7, Fig. 10 is a transverse sectional view on the line 10—10 of Fig. 1, Fig. 11 is a bottom plan view of the hopper showing a slightly modified form of moving means for the discharge-regulating plates of the machine, the plates being shown fully open, Fig. 12 is a similar view showing the plates partly closed, Fig. 13 is a vertical longitudinal sectional view on the line 13—13 of Fig. 11, Fig. 14 is a vertical transverse sectional view on the line 14—14 of Fig. 11.

In the drawings, the hopper of the machine is illustrated as comprising sides 1, a front 2, and a back 3. The bottom of the hopper of the machine is open and is closed to a greater or less degree by the discharge-regulating plates to be presently described. The usual handles 4 are secured to the sides of the hopper and project rearwardly therefrom. An axle 5 is journaled through the sides of the hopper and at its ends carries wheels 6 which support the machine.

As stated above, the bottom of the hopper is open and the material which is placed therein is discharged between the opposing edges of plates 7 which are mounted upon the bottom of the hopper. In mounting these plates, in the form of the invention shown in Figs. 7 and 8 of the drawings, the plates are formed with slots 8 which extend rearwardly at an angle from the opposing edges of the plates, and lag screws 9 are secured through the slots in the plates and into the bottom of the hopper. These screws 9 also engage through the ends of bars 10 which are disposed therebeneath and extend transversely of the hopper bottom. In this manner the plates 7 are mounted to slide forwardly or rearwardly beneath the hopper and as they are so slid, their opposing edges are moved toward or away from each other whereby to regulate the size of the opening through which the fertilizer is to be discharged.

In the form of the invention shown in the first nine figures of the drawings, the means for moving the plates 7 is shown as consisting in part of a pair of links 11 which are pivoted at their forward ends to the rear ends of the plates 7 and at their rear ends are pivoted to each other by means of the lower end of an arm 14 at one end of a rock shaft 15 mounted upon the back 3 of the hopper, which arm projects at its said end loosely through openings 13 in the said ends of the arms, there being a cotter pin 12 secured through the arm 14 to prevent disengagement of the said ends of the links. A hand lever 16 extends upwardly from the rock shaft and at its upper end carries a pivoted rod 17 having a hooked end 18 engageable interchangeably in openings 19 formed in a plate 20 secured upon the upper edge of one side of the hopper. By rocking the hand lever forwardly or backwardly, the plates 7 will be moved toward or away from each other in the manner before described.

In the modified form of the invention shown in Figs. 11, 12, 13, and 14 of the drawings, the plates 7 are not formed with the slots before described but to the forward ends of the plates are pivoted the ends of links 21 which at their forward ends are pivoted to the bottom of the hopper at the front. Other links 22 are pivoted at their forward ends to the bottom of the hopper at the rear and at their rear ends to the rear ends of the plates 7, and the same pivots which secure the links 22 to the plates 7 also secure the forward ends of links 23. These latter links correspond in function to the links 11 before described and are in a like manner connected with the lever arm 14. It will be understood from the foregoing that the links 21 and 22 perform the same function as do the slots and lag screws heretofore mentioned, that is, they guide the plates 7 and keep their opposing edges parallel at all times.

The means provided for feeding the fertilizer through the bottom of the hopper will now be described. Upon the axle 5 of the machine there is fixed a hub 25 provided with radial beater fingers 26, the hub being so positioned that the fingers will work between the opposing edges of the plates 7 when the machine is drawn over the ground. Other beater fingers 27 are secured through certain of the fingers 26 and project laterally to each side thereof. Shafts 28 are journaled in the sides of the hopper and carry beater fingers 29 which radiate therefrom and coöperate with the fingers 26 and 27 in disintegrating the fertilizer within the hopper prior to its discharge.

From the above it will be understood that the fingers 29 serve to feed the material downwardly to the fingers 26 and 27 and that the fingers 26 force the material from the hopper through the bottom thereof while the fingers 27 break up the material so that it will not be discharged in the form of lumps or large particles. That the fingers 26 and 27 perform this function is due to the fact that they extend at right angles to each other.

One of the wheels 6 is keyed or otherwise fixed to the axle 5 and the other wheel has its hub loosely mounted thereon and formed with a clutch face 30. A pin 31 serves to hold this latter wheel hub against inward movement upon the axle of the machine. Fixed upon the axle 5 for rotation therewith and for sliding movement thereon is a clutch member 32 designed to coöperate with the clutch face of the hub of the loose wheel. A collar 33 is fitted upon the member 32 and to the collar is connected the lower end of a lever 34 which is pivoted as at 35 in a suitable bracket upon one side of the machine and projects through a slot formed in a bracket 36 secured also upon the said side of the hopper. One wall of the slot is formed with notches 37 in which the lever 34 is seated when the clutch member 32 is in or out of engagement with the clutch face of the hub of the loose wheel. The lever 34 projects within convenient reach of the operator of the machine and may be readily operated to connect the axle of the machine with the wheels for rotation, whereby to actuate the beater fingers thereon.

Fixed upon the axle of the machine is a sprocket gear 38 about which and similar gears 39 upon the shafts 28 is trained a sprocket chain 40. It will be readily understood that the chain 40 serves to drive all of the beater fingers when the clutch is in. It will be observed from an inspection of Fig. 1 of the drawings that one of the shafts 28 is mounted at that end at which its driving sprocket is located, in a pivoted bearing 41 which is formed with an arcuate slot 42 through which passes a set bolt 43 secured in the adjacent side of the hopper. This screw serves to hold the bearing at adjustment to hold the chain 40 taut.

Secured at their rear ends to the sides of the hopper are angle iron bars 44 which converge forwardly of the hopper and then extend in spaced parallel relation as at 45. Between these bars, at their forward ends is fixed the upper end of a standard 46 consisting of two bars which diverge in a downward direction and are secured at their lower ends to the opposite sides of the furrow opener of the machine. This furrow opener, indicated by the numeral 47 is semiconoidal in form, its apex being presented forwardly. A clevis 48 is mounted at the upper end of the standard 46 and to it are to be connected the draft appliances. In order to firmly brace the bars 44 and thereby brace the standard 46 against vibration, bars 49 are secured at their rear ends to the front of the hopper and at their forward ends are secured by the same bolts which secure the standard between the forward ends of the said bars 44.

What is claimed is:

1. A fertilizer distributer, comprising a wheel mounted hopper provided in its bottom with an opening, plates arranged to move with relation to the hopper to increase or diminish the passageway through said opening, toggle levers arranged in sets with the inner ends of the members of each set pivoted together and the outer ends of the levers pivotally connected with the forward and rear end portions of the plates at the opposite sides of the hopper to cause them to move simultaneously in opposite directions, and means for moving the toggle levers.

2. A fertilizer distributer, comprising a wheel mounted hopper provided in its bottom with an opening, plates movably mounted with relation to the hopper to increase or diminish the passageway through the bottom thereof, toggle levers arranged in sets with the inner ends of the members of each set pivoted together and the outer ends of the levers pivotally connected with the forward and rear portions of the plates at the opposite sides of the hopper to cause them to move simultaneously in opposite directions, and a rock shaft journaled upon the hopper and operatively engaging one of the sets of toggle levers.

In testimony whereof I affix my signature in presence of two witnesses.

JOHN M. SANDERS.

Witnesses:
E. W. SMITH,
NORRIS N. SMITH.